United States Patent
de Lescure et al.

(10) Patent No.: US 12,438,829 B2
(45) Date of Patent: Oct. 7, 2025

(54) SYSTEM AND METHOD FOR DEADLOCK DETECTION IN NETWORK-ON-CHIP (NoC) HAVING EXTERNAL DEPENDENCIES

(71) Applicant: ARTERIS, INC., Campbell, CA (US)

(72) Inventors: Benoit de Lescure, Campbell, CA (US); Moez Cherif, Santa Cruz, CA (US)

(73) Assignee: ARTERIS, INC., Campbell, CA (US)

( * ) Notice: Subject to any disclaimer, the term of this patent is extended or adjusted under 35 U.S.C. 154(b) by 398 days.

(21) Appl. No.: 17/953,350

(22) Filed: Sep. 27, 2022

(65) Prior Publication Data

US 2023/0096061 A1    Mar. 30, 2023

Related U.S. Application Data

(60) Provisional application No. 63/250,111, filed on Sep. 29, 2021.

(51) Int. Cl.
*H04L 49/55* (2022.01)
*H04L 49/109* (2022.01)
*H04L 49/25* (2022.01)

(52) U.S. Cl.
CPC .......... *H04L 49/55* (2013.01); *H04L 49/109* (2013.01); *H04L 49/25* (2013.01)

(58) Field of Classification Search
None
See application file for complete search history.

(56) References Cited

U.S. PATENT DOCUMENTS

| | | |
|---|---|---|
| 5,485,396 A | 1/1996 | Brasen et al. |
| 5,541,849 A | 7/1996 | Rostoker et al. |
| 5,623,420 A | 4/1997 | Yee et al. |
| 5,638,288 A | 6/1997 | Deeley |
| 5,761,078 A | 6/1998 | Fuller et al. |
| 5,887,670 A | 3/1999 | Tabata et al. |
| 5,903,886 A | 5/1999 | Heimlich et al. |
| 5,983,277 A | 11/1999 | Heile et al. |
| 6,002,857 A | 12/1999 | Ramachandran |
| 6,134,705 A | 10/2000 | Pedersen et al. |
| 6,145,117 A | 11/2000 | Eng |

(Continued)

FOREIGN PATENT DOCUMENTS

| | | |
|---|---|---|
| CN | 105187313 B | 5/2018 |
| CN | 109587081 A | 4/2019 |

(Continued)

OTHER PUBLICATIONS

Anonymous: "Network on a chip—Wikipedia", Jun. 15, 2021, https://en.wikipedia.org/w/index.php?title-Network_on_a_chip&oldid=1028654828.

(Continued)

*Primary Examiner* — Jason E Mattis
*Assistant Examiner* — Bao G Nguyen
(74) *Attorney, Agent, or Firm* — Dana Legal Services; Jubin Dana

(57) ABSTRACT

Design of a network-on-chip (NoC) includes searching for a potential deadlock in a topology of the NoC, where the potential deadlock is caused by an external dependency in which input of data into the NoC is dependent on output of data from the NoC. The NoC design further includes modifying the NoC topology to resolve the potential deadlock.

7 Claims, 7 Drawing Sheets

(56) References Cited

U.S. PATENT DOCUMENTS

| | | |
|---|---|---|
| 6,249,902 B1 | 6/2001 | Igusa et al. |
| 6,321,363 B1 | 11/2001 | Huang et al. |
| 6,360,356 B1 | 3/2002 | Eng |
| 6,378,121 B2 | 4/2002 | Hiraga |
| 6,421,321 B1 | 7/2002 | Sakagawa et al. |
| 6,437,804 B1 | 8/2002 | Ibe et al. |
| 6,449,761 B1 | 9/2002 | Greidinger et al. |
| 6,622,225 B1 | 9/2003 | Kessler et al. |
| 6,883,455 B2 | 4/2005 | Maeda et al. |
| 6,907,591 B1 | 6/2005 | Teig et al. |
| 7,096,436 B2 | 8/2006 | Bednar et al. |
| 7,398,497 B2 | 7/2008 | Sato et al. |
| 7,587,687 B2 | 9/2009 | Watanabe et al. |
| 7,788,625 B1 | 8/2010 | Donlin et al. |
| 8,042,087 B2 | 10/2011 | Murali et al. |
| 8,302,041 B1 | 10/2012 | Chan et al. |
| 8,819,611 B2 | 8/2014 | Philip et al. |
| 9,184,998 B2 | 11/2015 | Xue |
| 9,262,359 B1 | 2/2016 | Noice et al. |
| 9,444,702 B1 | 9/2016 | Raponi et al. |
| 9,569,574 B1 | 2/2017 | Khan et al. |
| 9,792,397 B1 | 10/2017 | Nagaraja |
| 9,825,779 B2 | 11/2017 | Ruymbeke et al. |
| 9,940,423 B2 | 4/2018 | Lescure |
| 10,068,047 B1 | 9/2018 | Finn |
| 10,282,502 B1 | 5/2019 | BShara et al. |
| 10,348,563 B2 | 7/2019 | Rao et al. |
| 10,460,062 B2 | 10/2019 | Feld et al. |
| 10,565,346 B1* | 2/2020 | Suthar ............... G06F 30/392 |
| 10,733,350 B1 | 8/2020 | Prasad et al. |
| 10,853,545 B1 | 12/2020 | Nardi et al. |
| 10,922,471 B2 | 2/2021 | Baeckler et al. |
| 10,990,724 B1 | 4/2021 | Cherif et al. |
| 11,121,933 B2 | 9/2021 | Cherif et al. |
| 11,281,827 B1 | 3/2022 | Labib et al. |
| 11,449,655 B2 | 9/2022 | Cherif et al. |
| 2003/0093765 A1 | 5/2003 | Lam et al. |
| 2004/0040007 A1 | 2/2004 | Harn |
| 2004/0230919 A1 | 11/2004 | Balasubramanian et al. |
| 2005/0073316 A1 | 4/2005 | Graham |
| 2005/0268258 A1 | 12/2005 | Decker |
| 2007/0156378 A1 | 7/2007 | McNamara |
| 2007/0157131 A1 | 7/2007 | Watanabe et al. |
| 2007/0174795 A1 | 7/2007 | Lavagno et al. |
| 2007/0186018 A1 | 8/2007 | Radulescu et al. |
| 2008/0046854 A1 | 2/2008 | Tang |
| 2008/0049753 A1 | 2/2008 | Heinze et al. |
| 2008/0279183 A1 | 11/2008 | Wiley et al. |
| 2008/0291826 A1 | 11/2008 | Licardie et al. |
| 2009/0031277 A1 | 1/2009 | Mcelvain et al. |
| 2009/0313592 A1 | 12/2009 | Murali et al. |
| 2010/0061352 A1 | 3/2010 | Fasolo et al. |
| 2010/0162189 A1 | 6/2010 | Lavagno et al. |
| 2010/0218146 A1 | 8/2010 | Platzker et al. |
| 2010/0274785 A1 | 10/2010 | Procopiuc et al. |
| 2011/0170406 A1 | 7/2011 | Krishnaswamy |
| 2012/0013509 A1 | 1/2012 | Wisherd et al. |
| 2012/0311512 A1* | 12/2012 | Michel ............... G06F 30/3315 716/104 |
| 2013/0174113 A1 | 7/2013 | Ecler et al. |
| 2013/0208598 A1 | 8/2013 | Nakaya et al. |
| 2013/0258847 A1 | 10/2013 | Zhang et al. |
| 2013/0283226 A1 | 10/2013 | Ho et al. |
| 2014/0115218 A1 | 4/2014 | Philip et al. |
| 2014/0126572 A1 | 5/2014 | Hutton et al. |
| 2014/0153575 A1 | 6/2014 | Munoz |
| 2014/0156826 A1 | 6/2014 | Chang et al. |
| 2014/0160939 A1 | 6/2014 | Arad et al. |
| 2014/0169173 A1 | 6/2014 | Naouri et al. |
| 2014/0204735 A1 | 7/2014 | Kumar et al. |
| 2014/0211622 A1 | 7/2014 | Kumar et al. |
| 2014/0298281 A1 | 10/2014 | Varadarajan et al. |
| 2014/0321839 A1 | 10/2014 | Armstrong |
| 2015/0036536 A1 | 2/2015 | Kumar et al. |
| 2015/0106778 A1 | 4/2015 | Mangano et al. |
| 2015/0121319 A1 | 4/2015 | Hutton et al. |
| 2015/0178435 A1 | 6/2015 | Kumar |
| 2015/0254325 A1 | 9/2015 | Stringham |
| 2015/0341224 A1 | 11/2015 | Van et al. |
| 2015/0347641 A1 | 12/2015 | Gristede et al. |
| 2016/0103943 A1 | 4/2016 | Xia et al. |
| 2016/0275213 A1 | 9/2016 | Tomita |
| 2016/0321390 A1 | 11/2016 | Bozman et al. |
| 2017/0060204 A1 | 3/2017 | Gangwar et al. |
| 2017/0063734 A1 | 3/2017 | Kumar |
| 2017/0132350 A1 | 5/2017 | Janac |
| 2017/0177778 A1 | 6/2017 | Lescure |
| 2017/0193136 A1 | 7/2017 | Prasad et al. |
| 2018/0115487 A1 | 4/2018 | Thubert et al. |
| 2018/0144071 A1 | 5/2018 | Yu et al. |
| 2018/0218105 A1* | 8/2018 | de Lescure ........... G06F 30/394 |
| 2018/0227180 A1 | 8/2018 | Rao et al. |
| 2019/0012909 A1 | 1/2019 | Mintz |
| 2019/0073440 A1 | 3/2019 | Farbiz et al. |
| 2019/0205493 A1 | 7/2019 | Garibay et al. |
| 2019/0246989 A1 | 8/2019 | Genov et al. |
| 2019/0251227 A1 | 8/2019 | Fink |
| 2019/0260504 A1 | 8/2019 | Philip et al. |
| 2019/0363789 A1 | 11/2019 | Lee et al. |
| 2020/0092230 A1 | 3/2020 | Schultz et al. |
| 2020/0162335 A1 | 5/2020 | Chen et al. |
| 2020/0234582 A1 | 7/2020 | Mintz |
| 2020/0366607 A1 | 11/2020 | Kommula et al. |
| 2021/0203557 A1 | 7/2021 | Cherif et al. |
| 2021/0226887 A1 | 7/2021 | Mereddy |
| 2021/0320869 A1 | 10/2021 | Bourai et al. |
| 2021/0409284 A1 | 12/2021 | Cherif et al. |
| 2022/0121951 A1* | 4/2022 | Cassidy ............... G06N 3/063 |
| 2022/0294704 A1 | 9/2022 | Lescure et al. |

FOREIGN PATENT DOCUMENTS

| | | |
|---|---|---|
| CN | 113051215 A | 6/2021 |
| CN | 113055219 A | 6/2021 |
| DE | 102015014851 A1 | 5/2016 |
| EP | 3842987 A1 | 6/2021 |
| EP | 4024262 A1 | 7/2022 |
| EP | 4057179 A1 | 9/2022 |

OTHER PUBLICATIONS

Haytham Elmiligi et al: "Networks-on-chip topology optimization subject to power, delay, and reliability constraints", IEEE International Symposium on Circuits and Systems, May 30, 2010, pp. 2354-2357 DOI: 10.1109/ISCAS.2010.5537194.

Jain R. et al: "Predicting system-level area and delay for pipelined and nonpipelined designs", IEEE Transactions on Computer Aided Design of Integrated Circuits and Systems, vol. 11, No. 8, Jan. 1, 1992, pp. 955-965, DOI: 10. 1109/43.149767.

Jingye Xu et al: "Latch Based Interconnect Pipelining For High Speed Integrated Circuits", Proceedings of the International Conference on Electro/Information Technology, May 1, 2006, pp. 295-300 DOI: 10.1109/EIT.2006.252152.

Jun Minje et al: "Exploiting Implementation Diversity and Partial Connection of Routers in Application-Specific Network-on-Chip Topology Synthesis", IEEE Transactions on Computers, IEEE, USA, vol. 63, No. 6, Jun. 1, 2014 (Jun. 1, 2014), pp. 1434-1445, XP011550397, ISSN: 0018-9340, DOI: 10.1109/TC.2012.294.

Saponara S et al: "Design and coverage-driven verification of a novel network-interface IP macrocell for network-on-chip interconnects", Microprocessors and Microsystems, vol. 35, No. 6, pp. 579-592, XP028255708 ISSN: 0141-9331, DOI: 10.1016/J.MICPRO. 2011.06.005.

Saponara Sergio et al: "Configurable network-on-chip router macrocells", Microprocessors and Microsystems, IPC Business Press Ltd. London, GB, vol. 45, Apr. 29, 2016 (Apr. 29, 2016), pp. 141-150 XP029678799, ISSN: 0141-9331, DOI: 10.1016/J.MICPRO. 2016.04.008.

Song Z et al: "A NoC-Based High Performance Deadlock Avoidance Routing Algorithm", Computer and Computational Sciences,

(56) References Cited

OTHER PUBLICATIONS

2008. IMSCCS '08, International Multisymposiums on, IEEE Piscataway, NJ, USA, Oct. 18, 2008, pp. 140-143, XP031411025, ISBN: 978-0-7695-3430-5.
Chaari Moomen Moomen Chaari@Infineon Com et al: "A model-based and simulation-assisted FMEDA approach for safety-relevant E/E systems", Proceedings of the 34th ACM SIGMOD-SIGACT-SIGAI Symposium on Principles of Database Systems, ACMPUB27, New York, NY, USA, Jun. 7, 2015 (Jun. 7, 2015), pp. 1-6, XP058511366, DOI: 10.1145/2744769.2747908 ISBN: 978-1-4503-3550-8.
Mariani R et al: "Fault-Robust Microcontrollers for Automotive Applications", On-Line Testing Symposium, 2006. IOLTS 2006. 12th IEEE International COMO, Italy Jul. 10-12, 2006, Piscataway, NJ, USA,IEEE, Jul. 10, 2006 (Jul. 10, 2006), pp. 213-218, XP010928275, DOI: 10.1109/IOLTS.2006.38 ISBN: 978-0-7695-2620-1.
U.S. Appl. No. 17/134,384, filed Dec. 26, 2020, Federico Angiolini.
U.S. Appl. No. 17/665,578, filed Feb. 6, 2022, K. Charles Janac.
"a distributed interleaving scheme for efficient access to wideIO dram memory", Seiculescu Ciprian, Benini Luca, De Micheli Giovanni, CODES+ISSS'12 (Year: 2012).
"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.
19th Asia and South Pacific Design Automation Conterence Alberto Ghiribaldi, Herve Tatenguem Fankem, Federico Angiolini, Mikkel Stensgaard, Tobias Bjerregaard, Davide Bertozzi A Vertically Integrated and Interoperable Multi-Vendor Synthesis Flow for Predictable NoC Design in Nanoscale Technologies.
ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.
Alessandro Pinto et al, "System level design paradigms", ACM Transactions on Design Automation of Electronic Systems, ACM, New York, NY, US, (Jun. 7, 2004), vol. 11, No. 3, doi: 10.1145/1142980.1142982, ISSN 1084-4309, pp. 537-563, XP058222500.
Annual IEEE International SoC Conference Proceedings Mohammad reza Kakoee, Federico Angiolin, Srinivasan Murali, Antonio Pullini, Ciprian Seiculescu, and Luca Benini A Floorplan-aware Interactive Tool Flow for NoC Design and Synthesis pp. 1, 2, 4 2009 Belfast, Northern Ireland, UK.
Bo Huang et al, "Application-Specific Network-on-Chip synthesis with topology-aware floorplanning", Integrated Circuits and Systems Design (SBCCI), 2012 25th Symposium on, IEEE, (Aug. 30, 2012), doi:10.1109/SBCCI.2012.6344421, ISBN 978-1-4673-2606-3, pp. 1-6, XP032471227.
David Atienza et al, Network-on-Chip Design and Synthesis Outlook, Science Direct, Integration the VLSI, journal 41 (2008) 340-359.
Dumitriu Vet Al: "Throughput-Oriented Noc Topology Generation and Analysis for High Performance SoCs", IEEE Transactions on Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, DOI: 10.1109/TVLSI.2008.2004592.
Fangfa Fu et al: "A Noc performance evaluation platform supporting designs at multiple levels of abstraction", Industrial Electronics and Applications, 2009. ICIEA 2009. 4th IEEE Conference on, IEEE, Piscataway, NJ, USA, May 25, 2009 (May 25, 2009), pp. 425-429, XP031482069, ISBN: 978-1-4244-2799-4 * abstract* * p. 426-p. 429 *.
Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].
Jean-Jacques Lecler et al: Application driven network-on-chip architecture exploration & refinement for a complex SoC, Design Automation for Embedded Systems, vol. 15 no. 2, Apr. 7, 2011, DOI: 10.1007/S10617-011-9075-5.
K. R. Manik et al., "Methodology for Design of Optimum NOC Based on I PG," 2017 Int'l Conference on Algorithms, Methodology, Model and Applications in Emerging Technologies (ICAM-MAET), Chennai, India, IEEE, 6 pages. (Year: 2017).
Luca Benini: "Application specific Noc design", Design, Automation and Test in Europe, 2006, Date '06 : Mar. 6-10, 2006, [Munich, Germany; Proceedings] / [Sponsored by the European Design and Automation Association], IEEE, Piscataway, NJ, USA, Mar. 6, 2006 (Mar. 6, 2006), pp. 491-495, XP058393584, ISBN: 9783981080100.
Murali et al: "Synthesis of Predictable Networks-on-Chip-Based Interconnect Architectures for Chip Multiprocessors", IEEE Transactions on Very Large Scale Integration (VLSI) Systems, IEEE Service Center, Piscataway, NJ, USA, vol. 15, No. 8, Aug. 1, 2007 (Aug. 1, 2007) , pp. 869-880, XP011187732, ISSN: 1063-8210, DOI: 10.1109/TVLSI.2007.900742.
Partha et al., Design, Synthesis, and Test of Networks on Chips, IEEE (Year: 2005).
Picornell Tomas Tompic@GAP.UPV.ES et al: "DCFNoC A Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.
Srinivasan K et al, "Linear programming based techniques for synthesis of network-on-chip architectures", Computer Design: VLSI in Computers and Processors, 2004. ICCD 2004. Proceedings. IEEE International Conference on San Jose, CA, USA Oct. 11-13, 2004, Piscataway, NJ, USA,IEEE, (Oct. 11, 2004), doi:10.1109/ICCD.2004.1347957, ISBN 978-0-7695-2231-9, pp. 422-429, XP010736641.
Srinivasan Murali et al: "Mapping and physical planning of networks-on-chip architectures with quality- of-service guarantees", Proceedings of The 2005 Asia and South Pacific Design Automation Conference, Jan. 18, 2005, DOI: 10.1145/1120725.1120737.
Tobias Bjerregaard et al: " A Router Architecture for Connection-Oriented Service Guarantees in the MANGO Clockless Network-on-Chip", Proceedings of the IEEE Conference and Exhibition on Design, Automation, and Test in Europe, Mar. 7, 2005, DOI: 10.1109/DATE.2005.36.
Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.
Zhou Rongrong et al: A Network Components Insertion Method for 3D Application-Specific Network-on-Chip, Proceedings of the 11th IEEE International Conference on ASIC, Nov. 3, 2015, pp. 1-4, DOI: 10.1109/ASICON.2015.7516952.
Anonymous: "Intel Hyperflex Architecture HighPerformance Design Handbook", Oct. 4, 2021 (Oct. 4, 2021), pp. 1-147, XP093063924, Retrieved from the Internet: URL:https://cdrdv2.intel.com/vl/dl/getContent/667078?fileName=sl0_hp_hb-683353-667078.pdf.
James C. Tiernan. 1970. An efficient search algorithm to find the elementary circuits of a graph. Commun. ACM 13, 12 (Dec. 1970), 722-726. https://doi.org/10.1145/362814.362819.
Ken Eguro et al: "Simultaneous Retiming and Placement for Pipelined Net lists", Proceedings of the 16th International Symposium on Field-Programmable Custom Computing Machines, Apr. 14, 2008 (Apr. 14, 2008), pp. 139-148, XP031379339.

\* cited by examiner

SYSTEM AND METHOD FOR DEADLOCK DETECTION IN NETWORK-ON-CHIP (NoC) HAVING EXTERNAL DEPENDENCIES

CROSS REFERENCE TO RELATED APPLICATION

This application claims priority to and the benefit of U.S. Provisional Application Ser. No. 63/250,111 filed on Sep. 29, 2021 and titled DEADLOCK DETECTION IN NoC WITH EXTERNAL DEPENDENCIES by Moez CHERIF, et al, the entire disclosure of which is incorporated herein by reference.

TECHNICAL FIELD

The present technology is in the field of computer aided design tools, and more specifically, related to the design of networks-on-chip (NoCs), which are used to handle communication between units of a system-on-chip (SoC).

BACKGROUND

Network-on-chip (NoC) technology is being used at many semiconductor companies to support an ever-increasing number of cores on a single chip and a demand for ever-increasing processing power related to artificial intelligence (AI) and other applications. An NoC is superior to the old point-to-point connectivity by way of a more scalable communication architecture that makes use of packet transmissions.

A NoC typically includes network interface units, switches, adapters, buffers and other components. In a system-on-chip (SoC) or other system that implements a NoC, the system may include cores that provide data to the NoC (such cores are referred to as initiators), and cores that receive data from the NoC (such cores are referred to as targets). The NoC sends data from the initiators to the targets via packet-based transmission.

During the flow of data packets though the various components of the NoC, there is a potential for deadlock to occur. Deadlock can put the NoC in a stalled state with no possibility of evolutions. Stalled packets inside the NoC will not make progress unless the system is reset. Resetting the system is not a desirable solution for deadlock.

SUMMARY

In accordance with various embodiments and aspects herein, potential deadlock conditions are resolved during design of a network-on-chip (NoC). Systems and methods herein apply to a class of processes implemented in software generating automatically NoC topologies and any software with which a user will create or edit topology of a NoC.

In accordance with various embodiments and aspects herein, design of a NoC includes searching for a potential deadlock in a topology of the NoC, where the potential deadlock is caused by an external dependency in which input of data into the NoC is dependent on output of data from the NoC. The NoC design further includes modifying the NoC topology to resolve the potential deadlock.

BRIEF DESCRIPTION OF THE DRAWINGS

In order to understand the invention more fully, a reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through the use of the accompanying drawings.

DETAILED DESCRIPTION

The following describes various examples of the present technology that illustrate various aspects and embodiments of the invention. Generally, examples can use the described aspects in any combination. All statements herein reciting principles, aspects, and embodiments, as well as specific examples thereof, are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

Figure 1:
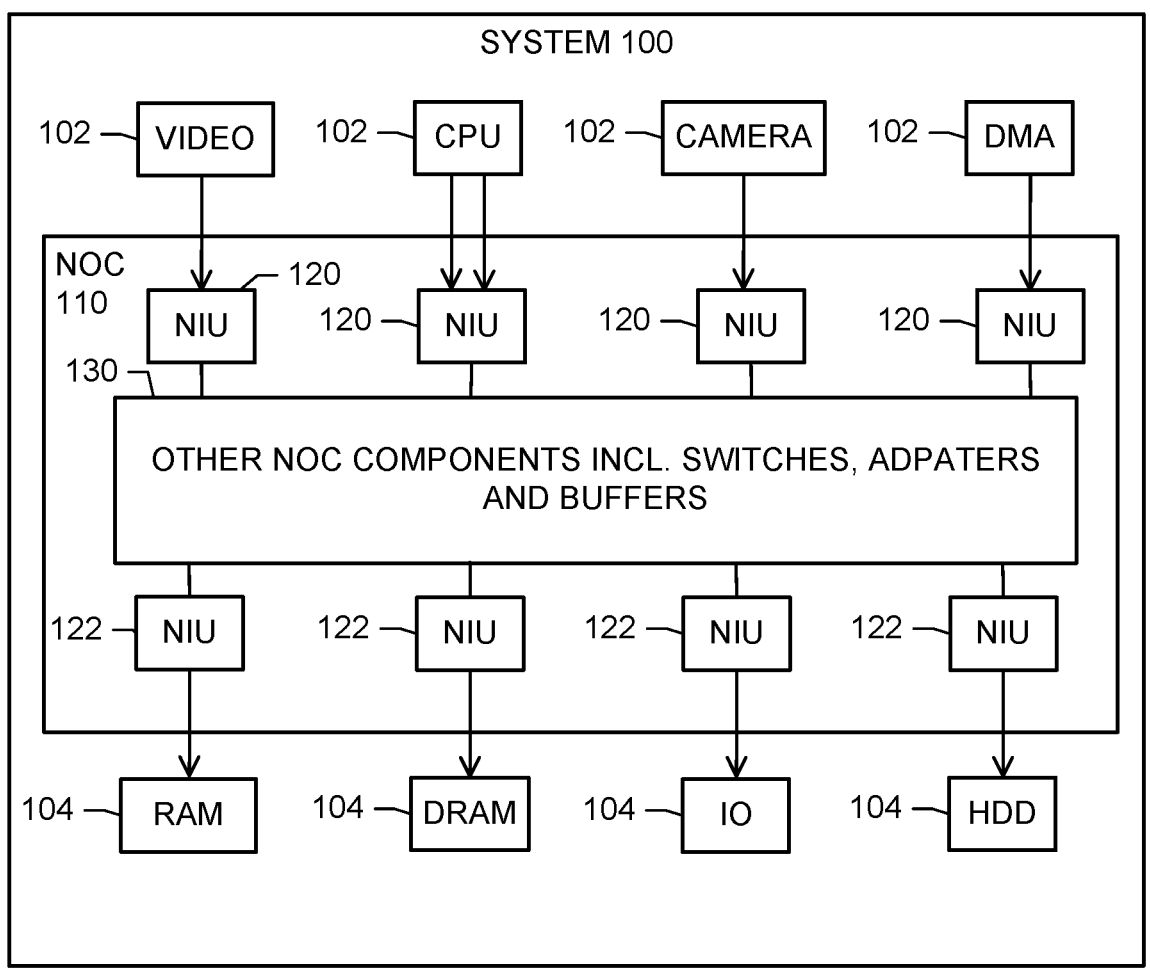
FIG. 1 is a block diagram that shows certain features of a system including a NoC according to various aspects and embodiments of the invention.

Reference is made to FIG. 1, which illustrates a system 100 including a plurality of cores 102 and 104 and an NoC 110 that provides packet-based communication between the cores 102 and 104. Those cores 102 that provide data to the NoC 110 are referred to as initiators 102, and those cores 104 that receive data from the NoC 110 are referred to as targets 104. Examples of the initiators 102 include, but are not limited to, a video card, central processing unit (CPU), camera, and direct memory access (DMA). Examples of the targets 104 include, but are not limited to, random access memory (RAM), dynamic random access memory (DRAM), input/output (IO), and hard disk drive (HDD). The system 1000 may be implemented as a system on chip.

The NoC 110 includes a plurality of network interface units (NIUs) 120 and 122, which interface with the cores 102 and 104. These NIUs 120 are responsible for translating several supported protocols and data sizes to and from a packet transport protocol. Those NIUs 120 that interface with initiators are referred to as initiator NIUs 120, and those NIUs 122 that interface with targets are referred to as target NIUs 122.

The NoC 110 further includes other components 130, such as switches, width adapters, firewalls, clock adapters, rate adapters, link probes, etc. Switches are used to route flows of traffic between initiator NIUs 120 and target NIUs 122. Adapters deal with various conversions between data width, clock, and power domains (e.g., CPU power domain). Buffers are used to insert pipelining elements to span long distances or store packets to deal with rate adaptation between fast initiators and slow targets or vice-versa. These components 120, 122 and 130 may use an internal NoC transport protocol to communicate with each other.

Figure 2:
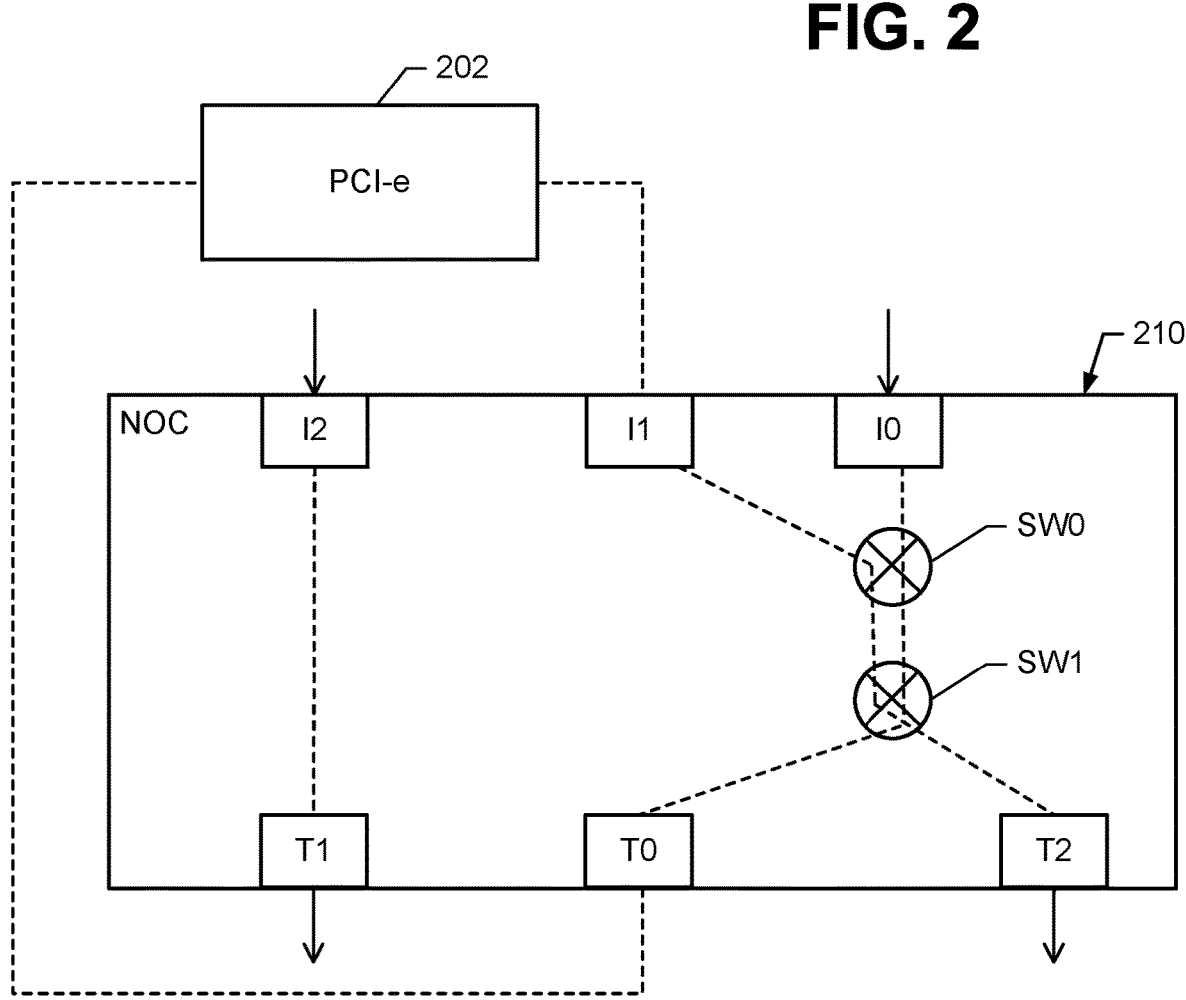
FIG. 2 shows an example of deadlock in a NoC due to external dependencies.

Reference is now made to FIG. 2, which shows a simple example of a NoC 210 having an external dependency. The NoC 210 includes initiator NIUs I0, I1 and I2, and target NIUs T0, T1 and T2. In this example, one of the initiators includes a Peripheral Component Interconnect Express (PCIe) controller 202, which has an initiator port and a target port. The initiator NIU I1 receives data from the initiator port of the controller 2002, and the target NIU T0 sends data to the target port of the controller 202. Data packets flow from the initiator NIU I1 to the target NIU T0 via switches SW0 and SW1. Progress of data packets flowing between the switches SW0 and SW1 depends on progress at the target NIU T0, through the PCIe controller 202, through initiator NIU I1, and back to the switches SW0 and SW1. The PCIe controller 202 might need to re-route the data received at its target port into its initiator port, thereby creating a traffic dependency external to the NoC 210. It has been found that this external dependency can potentially cause a deadlock within the NoC 210.

In accordance with the various aspects and embodiments herein, potential deadlocks are resolved during the design of a NoC rather than resolving actual deadlocks during runtime. Resolving the potential deadlocks during design improves system performance because it increases data throughput of the NoC and eliminates the need to shut down and restart a system that implements the NoC.

Figure 3:
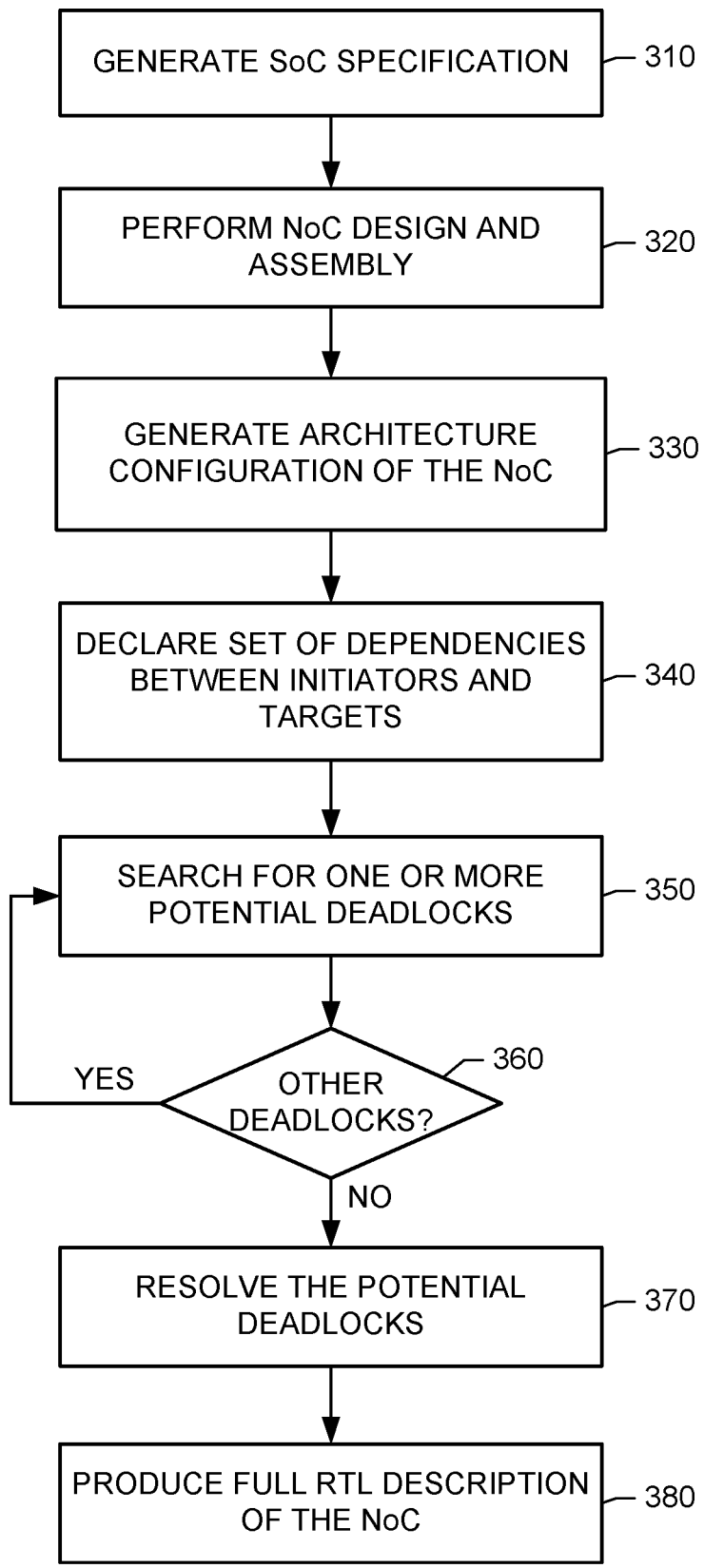
FIG. 3 shows an overview of a NoC design process according to various aspects and embodiments of the invention.

Reference is made to FIG. 3, which illustrates a NoC design process that resolves deadlocks in a NoC having external dependencies. By way of example, the NoC will be implemented in a SoC.

At block 310, an SoC specification is generated by an SoC architect. The specification provides a chip definition, technology, domains and layout for the SoC. The specification also defines the real estate for the NoC and other NoC constraints.

At block 320, a NoC architect performs NoC design and assembly. Intellectual property (IP) blocks are selected from a NoC architect's library, and the selected IP is instantiated. In addition, IP connection and assembly, sockets configuration, and end-to-performance capture may be performed. This stage produces a NoC description that defines the IPs (from SoC) and their related sockets and protocols, along with the communication flows between source and targets, and memory maps.

At block 330, an architecture configuration of the NoC is generated. A coarse level topology may be generated, and Power, Performance and Area (PPA) tradeoffs may be performed (unit duplication is decided together with size of buffers in switches for example). A loop from block 330 back to block 320 helps in finalizing the architecture configuration by changing the settings of parameters, changing connectivity schemes (e.g., from a mesh to crossbar or modified mesh), enabling of safety through unit duplication, etc. The loop goes on until the NoC architect is satisfied with the architecture (width of buses, quality of service, memory map, along many other criteria). A final NoC topology description is produced, for instance, in a computer-readable file or done through a user interface, in graphical or textual form. The description is stored in computer memory, ready for use by software.

At block 340, a set of dependencies between initiators and targets are declared. A description of the set of dependencies may be in a computer-readable file or done through a user interface, in graphical or textual form; then, the description is stored in computer memory, ready for use by software.

At block 350, a search is performed for one or more potential deadlocks caused by an external dependency in which input of data into the NoC is dependent on output of data from the NoC. In general, the topology is examined for segments that form a loop between an initiator NIU and a target NIU having an external dependency. If a loop is found, that loop is considered to represent a potential deadlock.

At block 360, detection of other potential deadlocks is performed. Such detection is performed until no other potential deadlocks have been detected.

At block 370, the NoC topology is modified to resolve the potential deadlocks. As examples, existing components may be reconfigured, new components (e.g., switches) may be added, etc.

In the embodiment shown in FIG. 3, the potential deadlocks may be resolved after all potential deadlocks have been detected according to various aspects and embodiments of the invention. In other embodiments, a potential deadlock may be detected and corrected before the next potential deadlock is detected.

At block 380, a full RTL description of the NoC and all collateral files are produced. Verification and validation are performed. After validation is complete against the given SoC constraints, the RTL description of the NoC is delivered to an SoC integrator. There the NoC design is integrated and validated as part of the full system.

Figure 4:
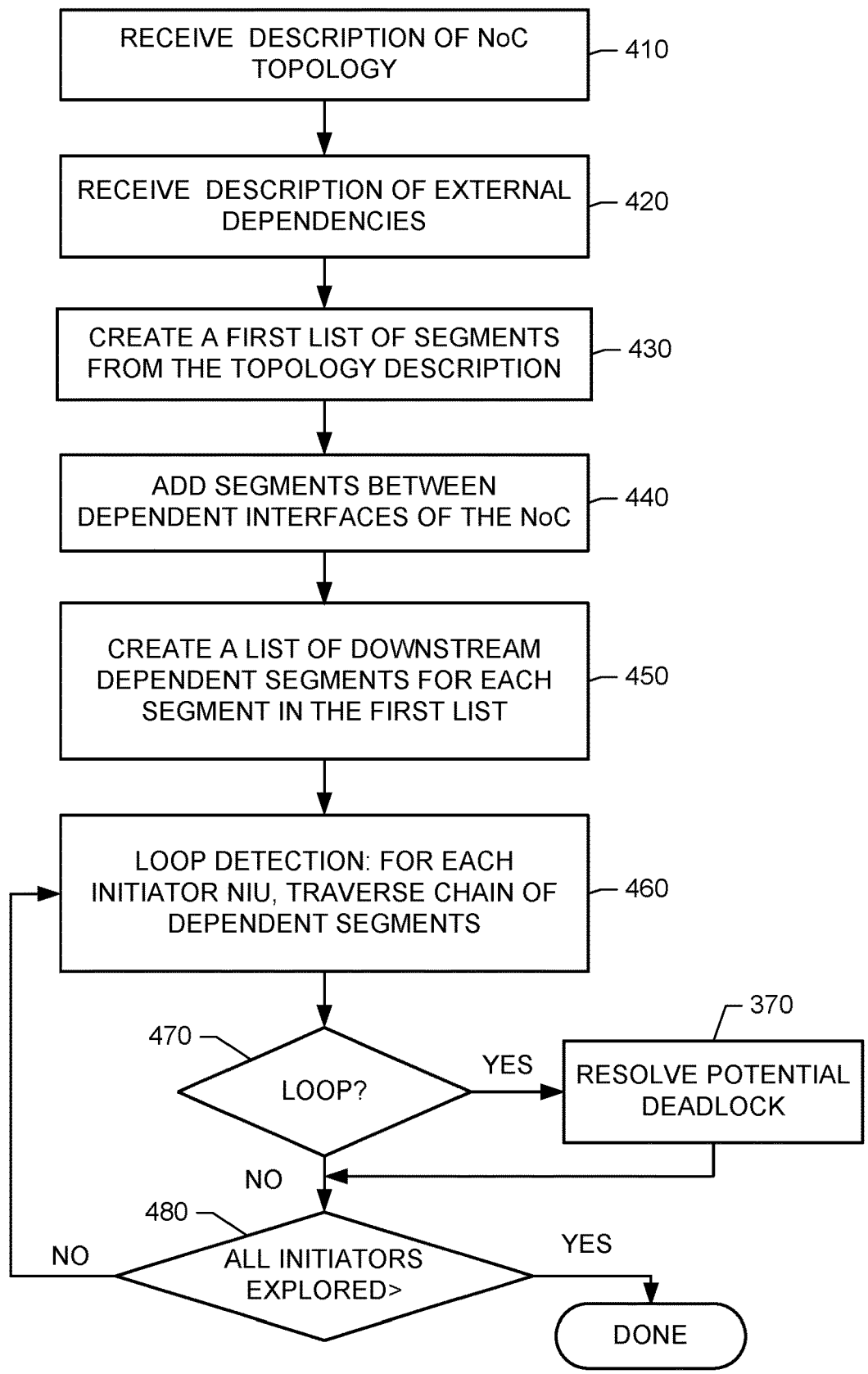
FIG. 4 shows a method of searching for potential deadlocks in a NoC according to various aspects and embodiments of the invention.

Reference is now made to FIG. 4, which illustrates an example of a method of searching for potential deadlocks. At block 410, a description of a NoC topology is received. At block 420, a description of external dependencies is received.

At block 430, a first list of segments is created from the topology description. As used herein, the term segment refers to a directed connection between two components of the NoC. Examples of segments include, but are not limited to, a connection between two switches, a connection between a switch and an adapter, and a connection between a network interface unit and a switch. A segment is directed in the sense that it has an origin and an end.

Figures 5, 6:
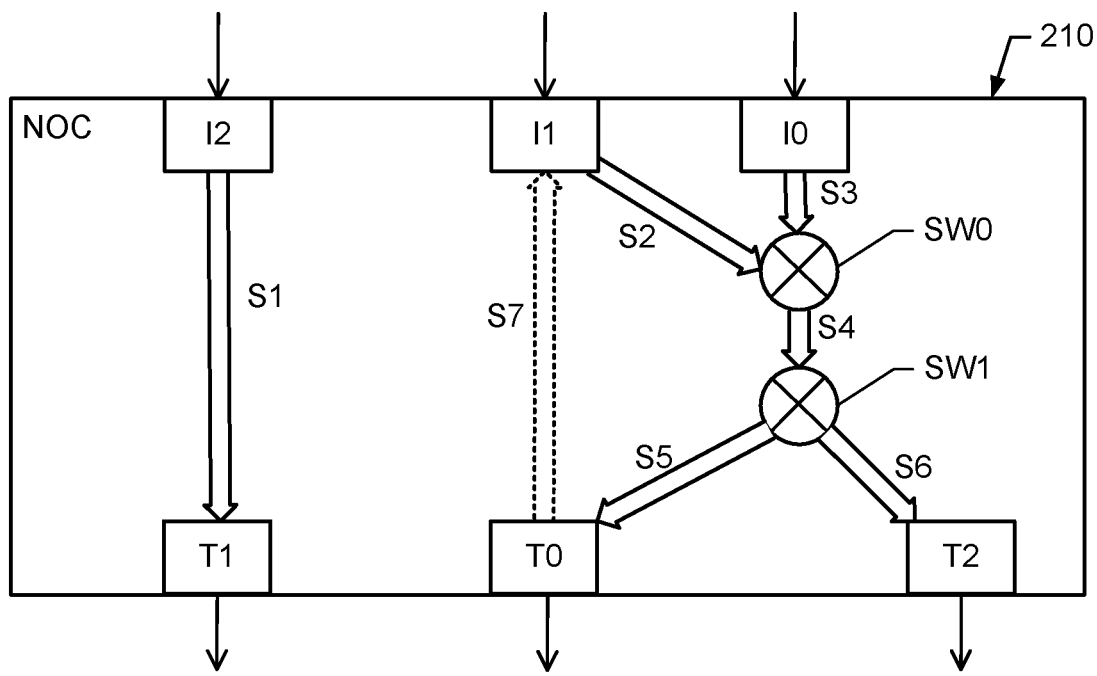
FIG. 5 shows representations of segments in the NoC of FIG. 2 according to various aspects and embodiments of the invention.
FIG. 6 shows lists of segments represented in FIG. 4 according to various aspects and embodiments of the invention.

Additional reference is made to FIGS. 5 and 6. FIG. 5 shows the segments in the NoC 210 of FIG. 2, and FIG. 6 shows a first list 610 of the segments. There is a first segment S1 between the initiator NIU I2 and the target NIU I2, a second segment S2 between the initiator NIU I1 and the switch SW0, a third segment S3 between initiator NIU I0 and switch SW0, a fourth segment S4 between switches SW0 and SW1, a fifth segment S5 between the switch SW1 and the target NIU T0, and a sixth segment S5 between the switch SW1 and the target NIU T2. These segments are represented as solid double arrows in FIG. 5.

At block 440, segments between dependent interfaces of the NoC are added to the first list. These external segments are created by examining the description of the external dependencies. For instance, if progress at the target NIU T0 depends on progress at the initiator NIU I1, then a seventh segment between the target NIU T0 and the initiator NIU I1 is added to the first list 610. This external segment is represented as a dash double arrow (see FIG. 5), and it is directed from the target NIU T0 to initiator NIU I1. This seventh segment S7 is also listed in the first list 610 (see FIG. 6).

At block 450, a list of downstream dependent segments is created for each segment in the first list. A given segment has a dependency on a downstream segment, if and only if, progress on the given segment (that is, forward movement of the packet transported on the given segment) might depend on progress on the downstream segment, where the given segment ends at the same component where the downstream segment begins.

In the example of FIG. 5 and FIG. 6, the segment S1 between initiator NIU I2 and target NIU T1 does not have any downstream dependent segments. The segment S6 between switch SW1 and target NIU T2 does not have any downstream dependent segments. Therefore, no lists are created for segments S1 and S6.

Progress between initiator NIU I1 and switch S0 (segment S2) depends on progress from switch SW0 to switch SW1. Therefore, a list 620 containing downstream segment S4 is created.

Progress between initiator NIU I0 and switch S0 (segment S2) also depends on progress from switch SW0 to switch SW1. Therefore, a list 622 containing downstream segment S4 is created.

Progress from switch SW0 to switch SW1 (segment S4) depends on progress from switch SW1 to target NIU T0. The progress also depends on progress from switch SW1 to target NIU T2. Therefore, a list 624 containing downstream segments S5 and S6 is created.

Progress between the switch SW1 and the target NIU T0 (segment S5) depends on the external dependency. Therefore, a list 626 containing downstream segment S7 is created.

Progress between target NIU T0 and initiator NIU I1 (segment S7) depends on progress from initiator NIU I1 to switch SW0. Therefore, a list 628 containing downstream segment S2 is created.

At block 460, loop detection is performed for each initiator NIU. For each of those NIUs, a chain of dependent segments is traversed to determine whether the chain forms a loop. A loop is not found if an NIU without external dependencies is reached. If no loops are found for any of those NIUs (blocks 470 and 480), then the NoC topology is said to be free of potential deadlocks caused by external dependencies.

If, however, a loop found (block 470), then the NoC topology is modified. In the example of FIGS. 5 and 6, there are no loops for initiator NIUs I0 and I2. For the initiator NIU I1, however, there is a loop formed by the segments S2, S4, S5, S7 from NIU I1->switch SW0->switch SW1->NIU T0->NIU I1.

Figure 7:
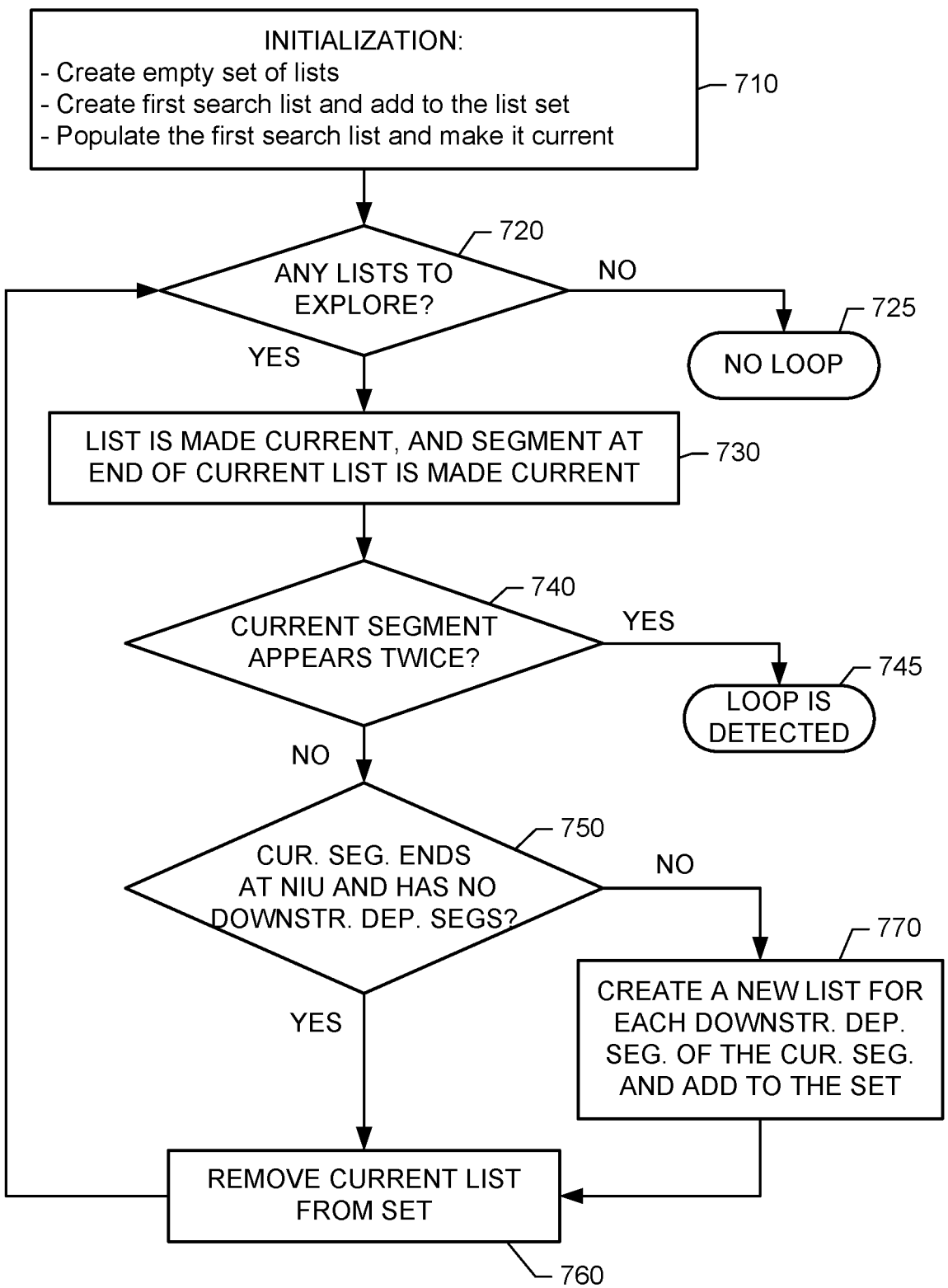
FIG. 7 shows a loop detection method according to various aspects and embodiments of the invention.

Reference is now made to FIG. 7, which illustrates an example of a loop detection process for block 460 of FIG. 4 according to various aspects and embodiments of the invention. In block 460, an initiator NIU is selected, and the method of FIG. 7 is performed on the selected NIU to determine whether a loop is detected.

At block 710, initialization is performed. An empty set of lists to explore is created, a first search list is created and added to the list set. The first search list is populated with a single segment: the segment originating from the selected initiator NIU.

At block 720, the list set is explored to determine whether the selected NIU has a loop. After initialization the list set will not be empty. However, after subsequent steps are performed and the method returns to block 720, the list set might be empty. If the list set is empty, an indication is made (e.g., a flag is set) that a loop is not detected for the selected NIU (block 725). Control is then returned to block 460 of FIG. 4.

At block 730, a list in the set is made current. The segment at the end of the current list is made current.

At block 740, if the current segment appears twice in the current list, an indication is made that a loop has been detected in the selected NIU (block 745), and control is returned to block 460 of FIG. 4. Otherwise, the method proceeds to block 750.

At block 750, if the current segment terminates at a target NIU, and if the current segment does not have a dependent downstream segment, then the current list is removed from the set (block 760), and the method returns to block 720. Otherwise, the method proceeds to block 760.

At block 760, a new list is created for each downstream dependent segment of the current segment and added to the set. Each new list may be cloned from the current list, and a downstream dependent segment is appended. Thus, if the current segment has three downstream dependent segments, then three new lists will be added to the set.

At block 770, the current lists were just explored, so it is removed from the list set. The method returns to block 720.

Consider the method of FIG. 7 when applied to the NIU 210 of FIG. 2 and the lists of FIG. 6. The initiator NIUs will be selected in the following order: NIU I2, NIU, I1, and NI I0.

Search of Initiator NIU I2

When initiator NIU I2 is selected, segment S1 is added to a first search list. Both the first search list and the segment S1 are made current. Since segment S1 does not occur twice in the current list, terminates at target NIU T1, and has no downstream dependent segments, the first search list is removed from the set, and control is returned to block 720. Since the list set is now empty, an indication is made that NIU I2 does not have a loop.

Search of Initiator NIU I2

When the initiator NIU I1 is selected, segment S2 is added to a first search list. Both the first search list and the segment S2 are made current. The current segment does not appear twice in the first search list, and it does not terminate at a target NIU, but it does have a dependent downstream segment S4, so a second search list with S2->S4 is created and added to the set. The first search list, having been explored, is removed from the set.

The second search list is made current and segment S4 is made current. The current segment has dependent downstream segments S5 and S6, so third and fourth search lists are created and added to the set. The third search list contains S2->S4->S5, and the fourth search list contains S2->S4->S6. The second search list, having been explored, is removed from the set.

The fourth search list is made current, and segment S6 is made current. Segment S6 terminates at target NIU T2 and does not have an external dependency. Therefore, the fourth list is removed from the set.

The third search list is made current, and segment S5 is made current. The current segment does not occur twice, but it does have a dependent downstream segment S7. Therefore, a fifth list is created and added to the set. The fifth list contains S2->S4->S5->S7. The third search list, having been explored, is removed from the set.

The fifth list is made current and segment S7 is made current. The current segment does not occur twice, but it does have a dependent downstream segment S2. Therefore, a sixth list is created and added to the set. The sixth list contains S2->S4->S5->S7->S2. The fifth search list, having been explored, is removed from the set.

The sixth list is made current, and segment S2 is made current. The current segment does occur twice. Therefore, an indication is made that a loop is detected for the selected NIU.

Search of Initiator NIU I0

After the initiator NIU I0 is selected, first and second lists are created and removed, and the set is populated with a third list containing S3->S4->S5 and a fourth list containing S3->S4->S6. The fourth list is removed from the set because segment S6 terminates at NIU T2 and does not have any further dependencies. The third list is made current and segment S5 is made current. The current segment does not occur twice, but it terminates at a target NIU that has a dependency, so a fifth list is created and the third list is removed from the set. The fifth list contains S3->S4->S5->S7. The fifth list is made current and segment S7 is made current. Segment S7 has a dependent downstream segment, so a sixth list is created to contain S3->S4->S5->S7->S2, and the fifth list is removed from the set. The sixth list is made current and segment S2 is made current, a seventh list is created to contain S3->S4->S5->S7->S2->S4, and the sixth list is removed from the set. The seventh list is made current, segment S4 is made current, and the current segment is found to occur twice in the current list. Therefore, an indication is made that a loop is detected for NIU I0.

The method of FIG. 7 is guaranteed to create all possible lists that originates from an initiator, and contains segments S(0), S(1) ... S(N), where a segment S(i) in one such list is followed immediately by a segment S(i+1), if and only if S(i+1) is a downstream dependent segment of S(i).

The method of FIG. 7 might seem like overkill for the NoC 210 of FIG. 2. However, it is computationally efficient and extremely thorough for a NoC having many switches, buffers, and other components.

A method herein is not limited to any particular NoC implementation. A system-on-chip is one example. Other types of implementations include, but are not limited to design implementations with configurable components, architecture prototyping and exploration.

Figure 8:
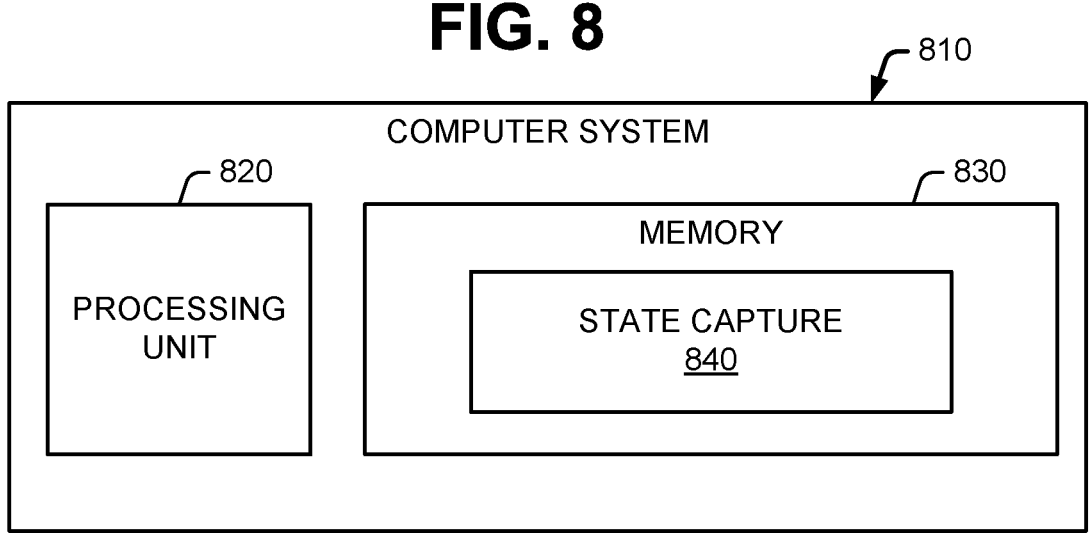
FIG. 8 shows an example of systems for resolving deadlocks in NoCs according to various aspects and embodiments of the invention.

Reference is made to FIG. 8, a method herein may be performed by a computer system 810 having a processing unit 820 and computer-readable memory 830. The memory 830 stores executable instructions 840 that, when executed, cause the processing unit 820 to detect potential deadlocks in a NoC topology having external dependencies; modify the NoC topology to resolve the potential deadlock; and generate a register transfer level (RTL) description of the NoC from the modified NoC topology.

Figure 9:
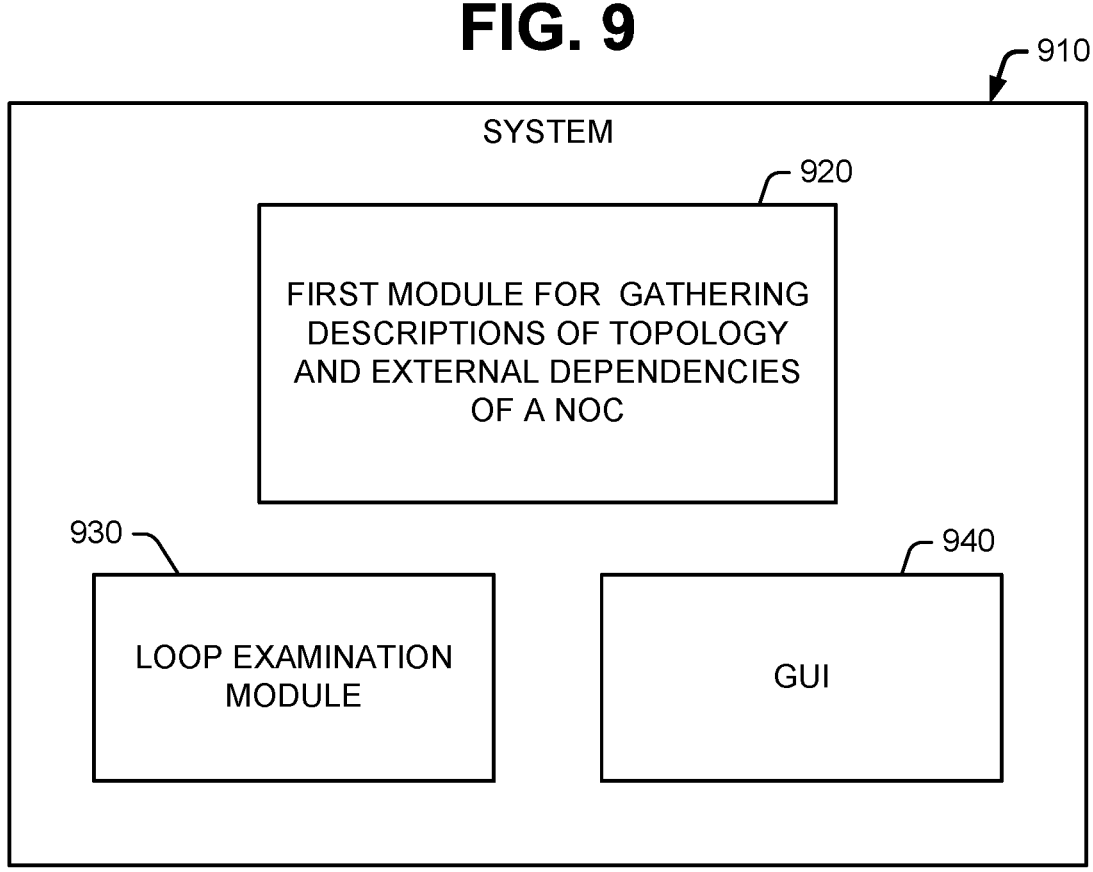
FIG. 9 shows an example of systems for resolving deadlocks in NoCs according to various aspects and embodiments of the invention

Reference is now made to FIG. 9 which illustrates another example of a system 910 for implementing a method herein. The system 910 includes a first module 920 for taking a list of initiators of traffic; a list of targets of traffic, a list of elements of a NoC that provide packet-based communications between the initiators and targets; a set of all routes between every initiator, through the NoC, to a target; and a description of external dependencies between the initiators and the targets. The system 910 further includes a second module 930 that uses the lists, set and description to examine the occurrence of loops in the NoC.

In accordance with various embodiments and aspects herein, the system 910 may optionally include a display or a graphical user interface (GUI) 940 that displays the segments and other details of a loop when one is detected. This visualization helps a NoC architect understand and correct a potential deadlock.

According to various aspects and embodiments of the invention, the tool is adapted for handling only sub-sections of the network on-chip. According to various aspects and embodiments of the invention, the tool is adapted to modify more than one NoC, wherein the NoC are interconnected and within a single chip or across multiple connected chips.

Certain methods according to the various aspects of the invention may be performed by instructions that are stored upon a non-transitory computer readable medium or memory and executed by a processor. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

What is claimed is:

1. A method of designing a network-on-chip (NoC), the method comprising:
   searching for a potential deadlock in a topology of the NoC, the potential deadlock caused by an external dependency in which input of data into the NoC is dependent on output of data from the NoC;
   modifying the NoC topology to resolve the potential deadlock;
   searching for at least one additional potential deadlock in the topology and modifying the NoC topology to resolve each additional deadlock,
   wherein the NoC includes a plurality of network interface units configured to interface with initiators (initiator NIUs) and a plurality of network interface units configured to interface with targets (target NIUs),
   wherein the NoC includes a plurality of network interface units configured to interface with initiators (initiator NIUs) and a plurality of network interface units configured to interface with targets (target NIUs) and wherein searching for a potential deadlock includes examining the topology for segments that form loops with respect to an initiator NIU and a target NIU having an external dependency, a potential deadlock detected if a loop is detected,
   wherein searching for a potential deadlock includes examining the topology for segments that form loops with respect to an initiator NIU and a target NIU having an external dependency, a potential deadlock detected if a loop is detected,
   wherein for each target NIU, a chain of dependent segments is traversed to determine whether the chain forms a loops,
   wherein examining the topology for segments that form loops includes:
      creating a first list of segments in the NoC topology, where each segment is a directed connection between two components in the NoC topology;
      adding to the first list segments between target NIUs having external dependencies to initiator NIUs;
      for each segment in the first list, creating a second list of downstream dependent segments, where each dependent segment depends on forward progress of packets from an upstream segment, whereby a set of second lists is created; and
      for each initiator NIU in the topology, traversing the set of second lists of dependent segments until reaching a target NIU with no external dependencies or until finding at least one loop.

2. The method of claim 1, further comprising generating a register transfer level (RTL) description of the NoC from the modified NoC topology.

3. The method of claim 2, wherein the NoC is implemented in a system-on-chip (SoC) and the method further comprises:
   generating a topology description of the NoC,
      wherein a description of external dependencies is received from an architect of the SoC, and
      wherein the NoC topology description and the external dependency description are used to search for a potential deadlock; and
   delivering the RTL description of the NoC to the architect.

4. A method of designing a network-on-chip (NoC), the method comprising:
   searching for a potential deadlock in a topology of the NoC, the potential deadlock caused by an external dependency in which input of data into the NoC is dependent on output of data from the NoC;
   modifying the NoC topology to resolve the potential deadlock;
   searching for at least one additional potential deadlock in the topology and modifying the NoC topology to resolve each additional deadlock,
   wherein the NoC includes a plurality of network interface units configured to interface with initiators (initiator NIUs) and a plurality of network interface units configured to interface with targets (target NIUs),
   wherein the NoC includes a plurality of network interface units configured to interface with initiators (initiator NIUs) and a plurality of network interface units configured to interface with targets (target NIUs) and wherein searching for a potential deadlock includes examining the topology for segments that form loops with respect to an initiator NIU and a target NIU having an external dependency, a potential deadlock detected if a loop is detected,
   wherein searching for a potential deadlock includes examining the topology for segments that form loops with respect to an initiator NIU and a target NIU having an external dependency, a potential deadlock detected if a loop is detected,
   wherein examining the topology for segments that form loops includes:
      creating all possible lists that originate from an initiator NIU and that contain segments $S(0), S(1) \ldots S(N)$, where a segment $S(i)$ in one such list is followed immediately by a segment $S(i+1)$, if and only if $S(i+1)$ is a downstream dependent segment of $S(i)$; and
      for each initiator NIU in the topology, traversing the lists until reaching a target NIU with no external dependencies or until finding at least one loop of segments.

5. A method of designing a network-on-chip (NoC), the method comprising:
   searching for a potential deadlock in a topology of the NoC, the potential deadlock caused by an external dependency in which input of data into the NoC is dependent on output of data from the NoC;
   modifying the NoC topology to resolve the potential deadlock;
   searching for at least one additional potential deadlock in the topology and modifying the NoC topology to resolve each additional deadlock,
   wherein the NoC includes a plurality of network interface units configured to interface with initiators (initiator NIUs) and a plurality of network interface units configured to interface with targets (target NIUs),
   wherein the NoC includes a plurality of network interface units configured to interface with initiators (initiator NIUs) and a plurality of network interface units configured to interface with targets (target NIUs) and wherein searching for a potential deadlock includes examining the topology for segments that form loops with respect to an initiator NIU and a target NIU having an external dependency, a potential deadlock detected if a loop is detected, wherein searching for a potential deadlock includes examining the topology for segments that form loops with respect to an initiator NIU and a target NIU having an external dependency, a potential deadlock detected if a loop is detected, wherein loop detection with respect to a selected initiator NIU includes:
- creating an empty set of lists;
- populating the set with a first search list having a segment originating from the selected initiator NIU;
- making, if the list is not empty, a list current and making current a segment at end of the current list;
- indicating, if the current segment appears twice in the current list, that a loop has been detected;
- removing, if the current segment terminates at a target NIU and has no dependent downstream segments, the current list from the set;
- creating a new list for each dependent downstream segment of the current segment;
- adding each new list to the set;
- removing the current list from the set; and
- making the list current and making current the segment at the end of the list made current.

6. The method of claim 5, wherein the loop detection further includes indicating, if the set is empty, that a loop is not detected for the selected NIU.

7. The method of claim 5, wherein creating a new list includes cloning the current list and appending a downstream dependent segment of the current segment.

* * * * *